(12) United States Patent
Deverick et al.

(10) Patent No.: US 8,671,202 B2
(45) Date of Patent: Mar. 11, 2014

(54) MECHANISMS FOR ROLE NEGOTIATION IN THE ESTABLISHMENT OF SECURE COMMUNICATION CHANNELS IN PEER-TO-PEER ENVIRONMENTS

(75) Inventors: James W. Deverick, Williamsburg, VA (US); Marcia Z. Bryan, San Jose, CA (US); Tiffany L. Broadbent, Williamsburg, VA (US)

(73) Assignee: Ooma, Inc., Palo Alto, CA (US)

( * ) Notice: Subject to any disclaimer, the term of this patent is extended or adjusted under 35 U.S.C. 154(b) by 168 days.

(21) Appl. No.: 13/317,015

(22) Filed: Oct. 6, 2011

(65) Prior Publication Data
US 2012/0271955 A1 Oct. 25, 2012

Related U.S. Application Data

(63) Continuation-in-part of application No. 12/317,077, filed on Dec. 17, 2008, now abandoned.

(60) Provisional application No. 61/008,962, filed on Dec. 20, 2007.

(51) Int. Cl.
*G06F 15/16* (2006.01)
*G06F 7/04* (2006.01)

(52) U.S. Cl.
USPC ............ 709/227; 709/230; 709/237; 726/3

(58) Field of Classification Search
USPC ............ 709/225–230, 235–237; 726/1–21
See application file for complete search history.

(56) References Cited

U.S. PATENT DOCUMENTS

| | | | |
|---|---|---|---|
| 6,128,659 | A | 10/2000 | Subblah et al. |
| 7,043,633 | B1 | 5/2006 | Fink et al. |
| 7,047,399 | B2 | 5/2006 | Sturges et al. |
| 7,590,734 | B2 | 9/2009 | Hui |
| 8,068,412 | B1 * | 11/2011 | Cortez et al. ............ 370/228 |
| 2004/0114922 | A1 | 6/2004 | Hardee |
| 2005/0105508 | A1 | 5/2005 | Saha |
| 2006/0036856 | A1 | 2/2006 | Kok |
| 2006/0039365 | A1 | 2/2006 | Ravikumar et al. |
| 2006/0190720 | A1 * | 8/2006 | Ozaki et al. ............ 713/160 |
| 2007/0027993 | A1 | 2/2007 | Schwagmann et al. |
| 2007/0189249 | A1 * | 8/2007 | Gurevich et al. ........ 370/338 |
| 2008/0005568 | A1 | 1/2008 | Watson et al. |

* cited by examiner

*Primary Examiner* — Yasin Barqadle
(74) *Attorney, Agent, or Firm* — Lumen Patent Firm

(57) ABSTRACT

Methods of establishing secure communication channels in peer-to-peer environments are provided that eliminate role conflicts between peers by determining which peer will act as a client and which the peer will act as a server in a secure connection handshake. In one embodiment, an attribute of the handshake messages are used in a tiebreaker process to determine which peer assumes the role of the server. In another embodiment, the attribute may be used to compute a wait period for each peer, or the wait period may be based on a random time period, and the peers cancel their request and resent requests after waiting their respective time periods.

7 Claims, 4 Drawing Sheets

MECHANISMS FOR ROLE NEGOTIATION IN THE ESTABLISHMENT OF SECURE COMMUNICATION CHANNELS IN PEER-TO-PEER ENVIRONMENTS

CROSS-REFERENCE TO RELATED APPLICATIONS

This application is a continuation-in-part of U.S. patent application Ser. No. 12/317,077 filed Dec. 17, 2008 now abandoned, which claims priority from U.S. Provisional Patent Application 61/008,962 filed Dec. 20, 2007, both of which are incorporated herein by reference.

FIELD OF THE INVENTION

This invention relates generally to peer-to-peer (P2P) data networks. More particularly, it relates to methods for establishing a secure communication channel in a P2P environment between two peers.

BACKGROUND OF THE INVENTION

Typically, when endpoints of a network application wish to communicate securely, they negotiate a secret key that they will use to encrypt and decrypt their messages. This negotiation is usually implemented as a multiple-message "handshake." One side of the connection initiates this process by sending a specially encoded message indicating that it wishes to acquire a secure communication channel. After agreeing on parameters for the connection, the two sides exchange segments of data that, when combined, allow each side to derive the same symmetric key used for securing application data. It is difficult for other parties to derive the same key by observing the handshake traffic.

A fundamental aspect of this key negotiation is the sequential ordering of the handshake messages. If any message is received out of order, the connection will fail. This is not a problem for applications in which requests for connections are sent from clients to persistent servers, such as in web and mail service. Most security protocols are designed with this use case in mind, and assume that endpoints already know whether they are client or server. In peer-to-peer (P2P) environments, however, where the roles of client and server are not predetermined or fixed, these handshake protocols can fail because it is not clear which side will begin the negotiation (and assume the client role). In a P2P environment, any two peers may wish to establish a secure communication channel. Two peers may attempt to negotiate secure channels with each other at the same time, simultaneously sending handshake initiation messages to each other. In this case, both peers assume client roles, and when the initial handshake messages reach their destinations, both connection attempts will fail on protocol errors, because both sides were expecting server responses.

Several protocols exist that implement key negotiation between endpoints. Some, such as IPSec, operate at the network layer, and provide point-to-point encryption and authentication without modification of the application code. Network-layer protocols, however, require operating system or hardware support and are not available in all environments. This is particularly true of embedded environments with minimal operating systems and limited resources, such as telephony equipment. In contrast, programmers can implement transport-layer protocols directly, without the need for operating system support. One such example is Transport Layer Security (TLS), commonly used on web and email servers. Regardless of the layers at which they operate, existing protocols, because they were designed for traditional client-server paradigms, suffer from the above described failure to resolve secure connection negotiation errors in P2P environments.

Some work exists, such as Kok 2006, that attempts to relax the client-server model in network-layer protocols, particularly IPSec. This work, however, makes certain assumptions about the environment in which it operates, such as the presence of an online authentication server, that may not be universally applicable. Additionally, there are certain performance implications to the existing approaches that are undesirable in an environment with limited resources. Particularly, there is a significant increase in network traffic and computational load because the adjustments to the protocol are applied in all cases, regardless of whether or not a role conflict exists.

SUMMARY OF THE INVENTION

The present invention provides an alternative approach that makes fewer assumptions about the operating environment. It allows for offline provisioning of clients so that an online authentication server is not required. It also detects and responds to client/server role conflicts, and modifies existing protocols only when necessary, resulting in a significant performance difference that distinguishes it from other approaches.

The present invention provides a method for establishing secure communication between peers in a P2P environment using a security model that allows arbitrarily timed connection requests, including simultaneous requests from both ends of the same potential connection. Thus, peers are able to detect and resolve role conflicts.

A role conflict occurs when a peer receives a secure connection request from another peer to which it already sent a secure connection request, so the peer receives a new request instead of a response to its existing secure connection request. The expected ordering of the connection negotiation is violated, resulting in an error condition.

The present invention provides new methods for establishing client and server roles during secure communication channel setup. These techniques may be applied either at the application level, requiring no modification to the underlying security protocol, or integrated directly into the security protocol itself.

According to one aspect of the invention, when a role conflict is detected by the application, both peers will drop or cancel their existing requests and drop or deny any incoming requests. The peers will wait a random amount of time, and then retry the secure connection request if a secure connection has not already been established.

According to another aspect of the invention, when a role conflict is detected, attributes of the handshake messages sent by the peers are used as a tiebreaker between the peers. The tiebreaker determines which peer will act as the client and which one will act as the server in the secure connection handshake. The peer that becomes the server will cancel its secure connection request and send a response back to the other peer's request. The peer that becomes the client will drop or deny the incoming request and wait for a response to its request. If the tie cannot be broken, the incoming request is be dropped or denied and the peers generate new requests with new tiebreaker values.

According to yet another aspect of the invention, when a peer detects a role conflict, it will use an attribute of the handshake message as a tiebreaker to determine a wait period before resending a connection request. The peers cancel their own requests, drop or deny the incoming requests, and wait a random amount of time before resending the connection request. In this approach, the random time intervals used by the peers can be different, possibly based on the tiebreaker value, to reduce the chances for subsequent role conflicts.

It is important to note that in all of these approaches, the initiating peers operate as though they are clients unless they are forced into the server role as a result of a detected and resolved role conflict. In most cases, role conflicts will not occur. Instead, the peers assume they are clients until the protocol determines that they shall assume the server role. Such a conflict occurs when two peers simultaneously (or nearly simultaneously) attempt initiate secure connections with one another.

According to one aspect, in a peer-to-peer (P2P) network, a method is provided for establishing a secure connection between a first peer (P1) in the P2P network and a second peer (P2) in the P2P network. The method includes sending by P1 a first secure connection request (R1) to P2; receiving by P1 a second secure connection request (R2) from P2; generating by P1 an error condition E in a negotiation of the secure connection between P1 and P2; computing by P1 a random value (V1); cancelling by P1 the request R1; discarding by P1 the request R2; and resending by P1 the request R1 to P2 after waiting a period of time based on the value V1.

According to another aspect, in a peer-to-peer (P2P) network, a method is provided for establishing a secure connection between a first peer (P1) in the P2P network and a second peer (P2) in the P2P network. The method includes sending by P1 a first secure connection request (R1) to P2; receiving by P1 a second secure connection request (R2) from P2; generating by P1 an error condition E in a negotiation of the secure connection between P1 and P2; computing by P1 a value (V1) of a first tie breaking attribute of R1; cancelling by P1 the request R1; discarding by P1 the request R2; and resending R1 to P2 after waiting a period of time based on the value V1.

According to yet another aspect, in a peer-to-peer (P2P) network, a method is provided for establishing a secure connection between a first peer (P1) in the P2P network and a second peer (P2) in the P2P network. The method includes sending by P1 a first secure connection request (R1) to P2; receiving by P1 a second secure connection request (R2) from P2; generating by P1 an error condition E in a negotiation of the secure connection between P1 and P2; computing by P1 a first value (V1) of a first tie breaking attribute of R1; computing by P1 a second value (V2) of a second tie breaking attribute of R2; comparing by P1 the values V1 and V2 to determine a tie breaker result for P1 and P2; and assigning by P1 a client/server role to P1 based on the comparison of V1 and V2. The method may also include, if P1 is assigned a server role based on the comparison of V1 and V2, then cancelling by P1 the request R1. Alternatively, the method may include, if P1 is assigned a client role based on the comparison of V1 and V2, then discarding by P1 the request R2.

DETAILED DESCRIPTION

Figure 1:
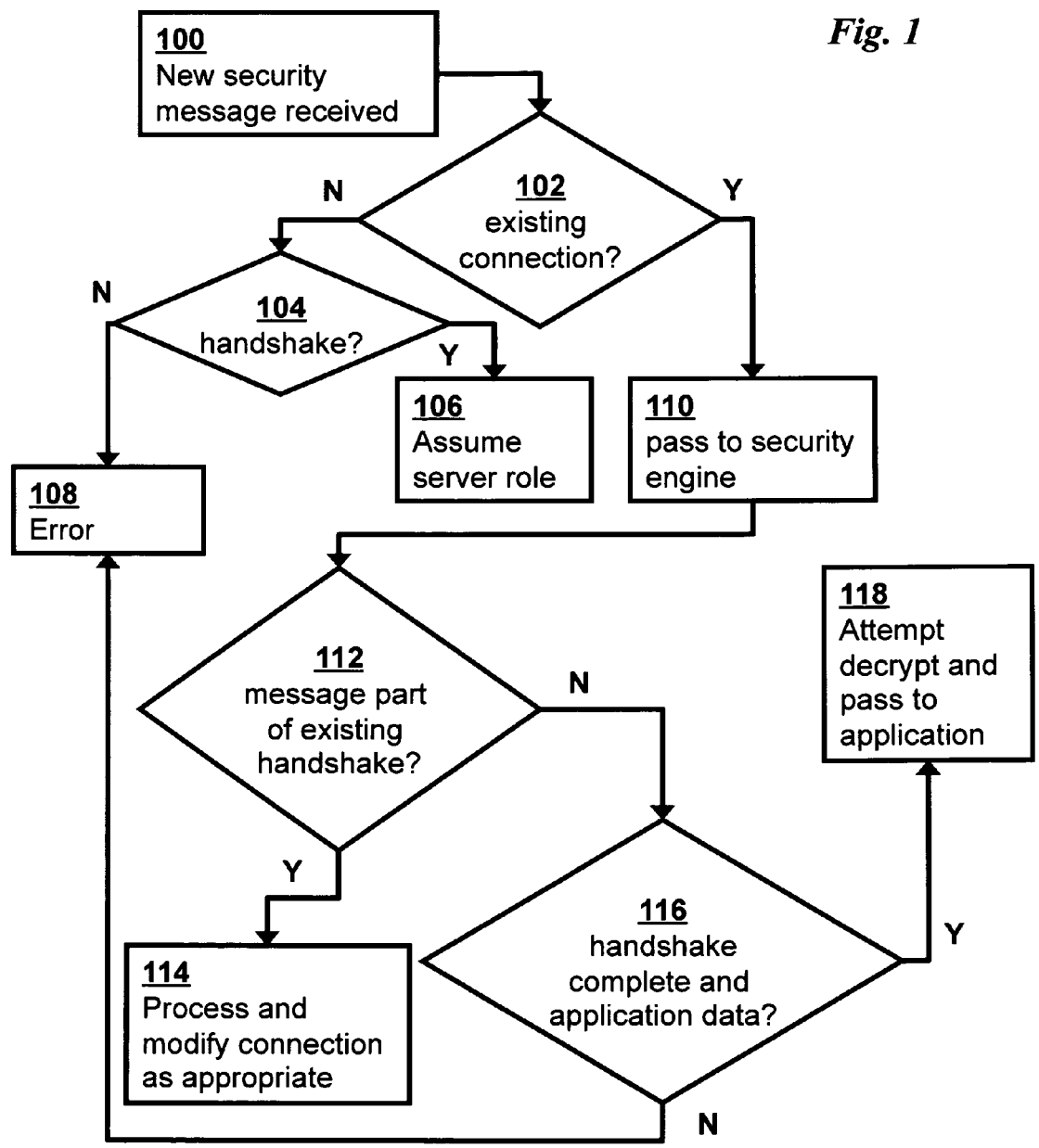
FIG. 1 is a flow chart illustrating steps of a method for negotiating a secure connection between two peers in a P2P network, illustrating steps taken when a new security message is received by a peer, according to a "back off and retry" technique of the invention.

FIG. 1 is a flow chart illustrating steps of a method for negotiating a secure connection between two peers in a P2P network, illustrating a "back off and retry" technique of the invention. This back off and retry mechanism may be applied at the application layer and the transport layer. The following rules used by the receiving and sending peers define an algorithm that allows a P2P communications device to engage in secure communication with other peers using an unmodified client/server handshake protocol. Both sending and receiving peers maintain information about the existence of connections with other peers.

The steps shown in FIG. 1 begin when a new security message is received by a peer at step 100. When a new security message arrives at the peer (i.e., this does not apply to ordinary traffic the application receives), the peer first checks in step 102 to see if it has an existing connection with the source peer sending the message. If there is not an existing connection (including an attempted connection), then in step 104 the received message is checked to see if it is an handshake initiation request. If the received message was a handshake initiation request, then in step 106 the receiving peer assumes the server role, and participates in the new connection handshake. If the received message was not a handshake initiation request, then an error has occurred as shown in step 108. The handling of this error will be described later.

If the receiving peer does have an existing connection with the sender, then in step 110 the receiving peer passes the received message to the security engine associated with the connection for processing. In step 112, the message is then checked to see if it is part of an existing handshake process. If the message is part of an existing handshake process, then in step 114 the engine will process the handshake step and modify the connection state accordingly. If the message is not part of an existing handshake (i.e., it is application data or a new handshake), then step 116 checks to see if the handshake has completed and this is application data. If the handshake has completed and this is application data, then in step 118 the engine will attempt to decrypt it and return it for delivery to the application. If the handshake has not completed or this is not application data (such as a new handshake), an error has occurred as shown in step 108.

Figure 2:
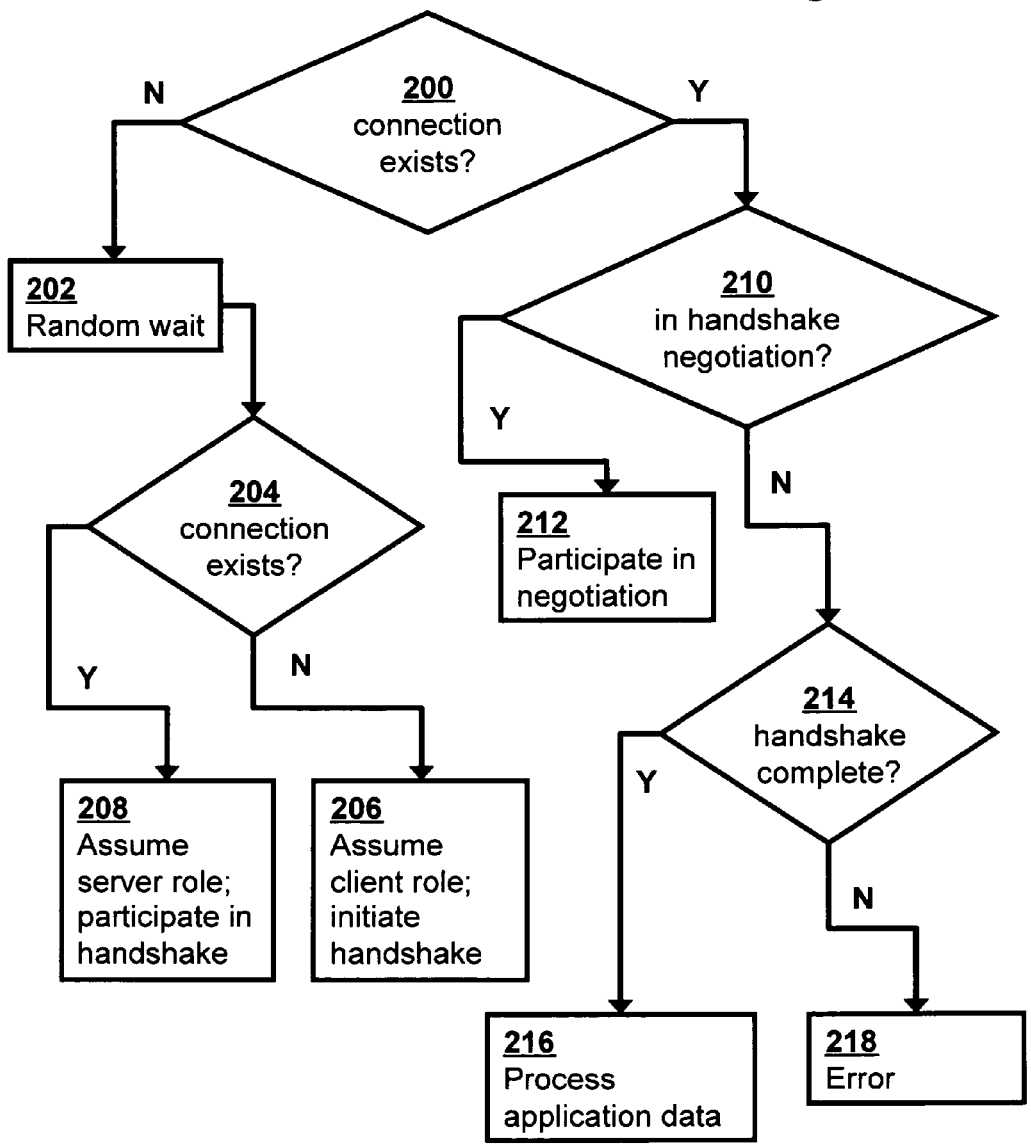
FIG. 2 is a flow chart illustrating steps of a method for negotiating a secure connection between two peers in a P2P network, illustrating steps taken when a security message is to be sent by a peer, according to a "back off and retry" technique of the invention.

FIG. 2 illustrates steps taken when a security message is to be sent by a peer, according to the "back off and retry" technique of the invention. When a message is to be sent to another peer, the sending peer first checks in step 200 to see if a connection exists for the destination of the message. If the sending peer does not have an existing connection for the destination, then in step 202 the sending peer waits for a small random amount of time. After waiting, the sending peer checks for the existence of a connection again in step 204. If there is still no connection present, then in step 206 the sending peer assumes the role of client, and initiates a new connection handshake. If a connection is now present, then in step 208 the sending peer assumes the role of server, and participates in the connection handshake.

Note that the delay before the send is a result of the error handling which will be described below. In some embodiments, one could also place the delay after entering the error state, and not use the delay before sending.

If step 200 determines that the sending peer does have an existing connection for the destination, then the sending peer determines whether the connection is ready for application data, or requires additional handshake processing: In step 210, the peer checks to see if the connection is in handshake negotiation state. If the connection is in a handshake negotiation state, then in step 212 the sending peer participates in the existing negotiation and waits for it to complete before sending any application data. If the connection is not in a handshake negotiation state, then step 214 checks if the negotiation has completed. If the peer has successfully completed a handshake, then in step 216 the sending peer provides the application data to the security engine for encryption and wire line transmission. If the connection is not in a handshake negotiation state, but has not successfully completed a handshake, then an error has occurred, as shown in step 218.

Once the handshake is complete, application data may be encrypted and sent between the peers.

Because of the random nature of the waiting period before transmission of the new connection handshake message, it is still possible for two peers to collide on connection setup. If both peers randomly select the same wait time before sending the initial message, they will likely both select client roles. Because of this, the following additional rule applies to all connections in the handshake processing state:

Errors described in relation to the above two flowcharts are handled as follows. If either client or server ever detects that an error has occurred, for example state 108 or 218, it destroys the connection associated with the error, and begins the process of initiating a connection again. This process can be repeated until the connection succeeds. Because each attempt will select different random wait times before sending the initial message, it is likely that one side will eventually be selected as the client.

An alternate implementation of this approach places the back off and retry mechanism in the underlying security protocol instead of in the application layer as described above.

In this implementation, the algorithm for detecting and resolving role conflict using back off and retry is as follows: When a new secure connection request arrives, the peer checks if there is an existing connection. If not, then it assumes the server role. If there is an existing connection, then it cancels the existing connection, drops the incoming request, calculates a random wait time, and resends the request if no connection exists when random wait period is over.

Figure 3:
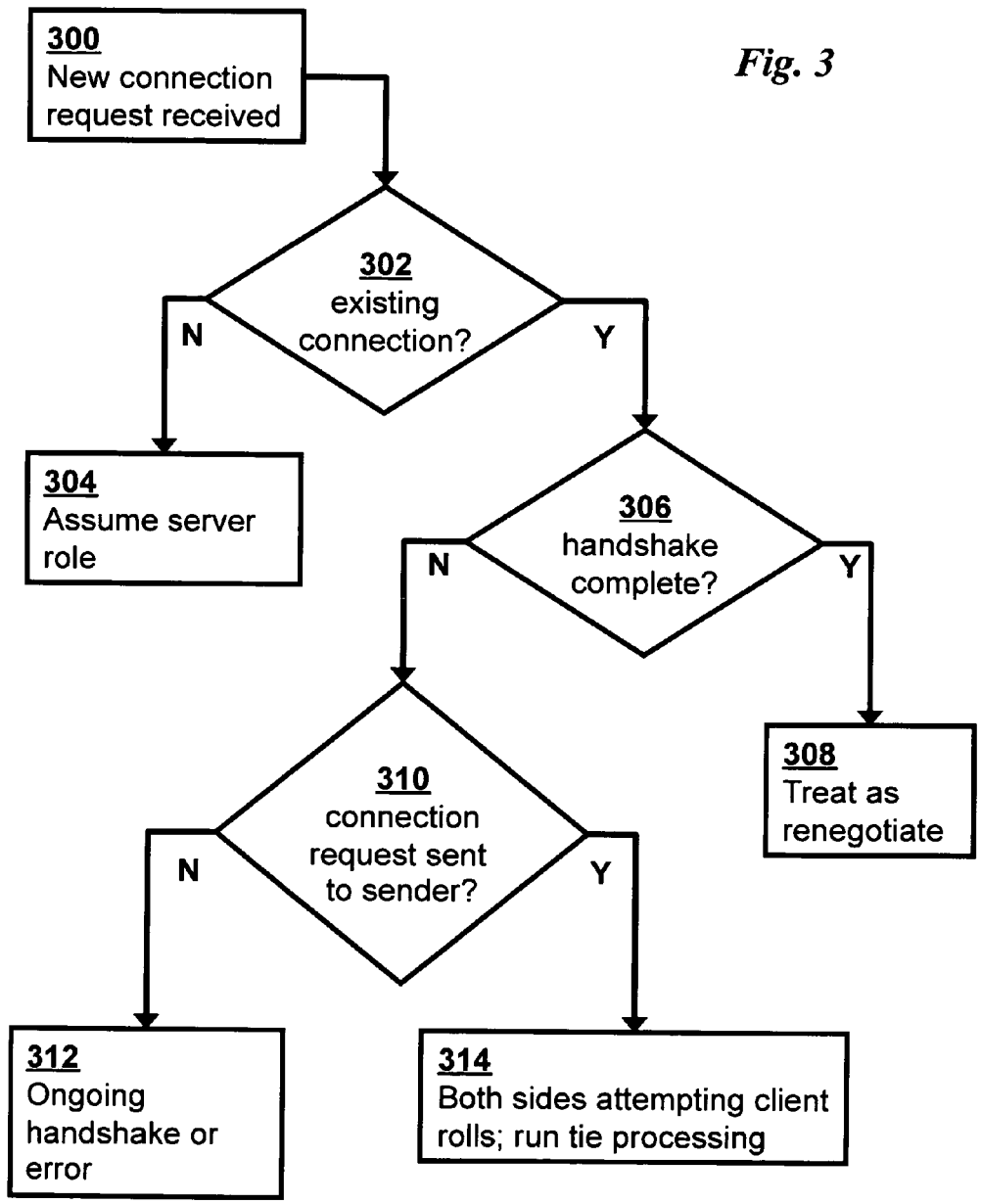
FIG. 3 is a flow chart illustrating steps of a method for negotiating a secure connection between two peers in a P2P network, illustrating steps taken when a new connection request message is received by a peer, according to a "tie breaking" technique of the invention.

FIG. 3 is a flow chart illustrating steps of a method for negotiating a secure connection between two peers in a P2P network using a "tie breaking" technique of the invention. According to this approach to resolving the client/server handshake role conflicts, the underlying protocol is modified to support the condition when both sides of the connection select the same role. Specifically, the value of some attribute of the received handshake message is used by the receiving peer together with a corresponding attribute of the handshake message sent by the peer as a tiebreaker to determine which peer will assume the client role. This attribute could, for example, be the Random value of a TLS or DTLS ClientHello message.

The following rules define a new algorithm that the underlying security protocol implements in order to break ties between two peers who wish to initiate secure communication with each other at the same time. When a new connection request is received in step 300, the peer checks in step 302 to see if an existing connection to sending peer exists (including an in-progress connection). If the receiving peer does not have an existing connection to the sending peer, then in step 304 the receiving peer assumes the server role and participates in the handshake normally. If the receiving peer does have an existing connection to the sending peer, then in step 306 the peer checks to see if handshake is completed. If so, then in step 308 receiving peer treats the connection request as a renegotiation of the existing connection. If handshake is not completed, then in step 310 the receiving peer checks to see if it previously sent a connection request to the sender. If not, then in step 312 the peer processes the message as part of an ongoing or error (depending on specifics of security protocol). If so, then both sides have attempted to choose the client role, and the peer uses a tie breaker processing 314 to resolve the conflict.

Figure 4:
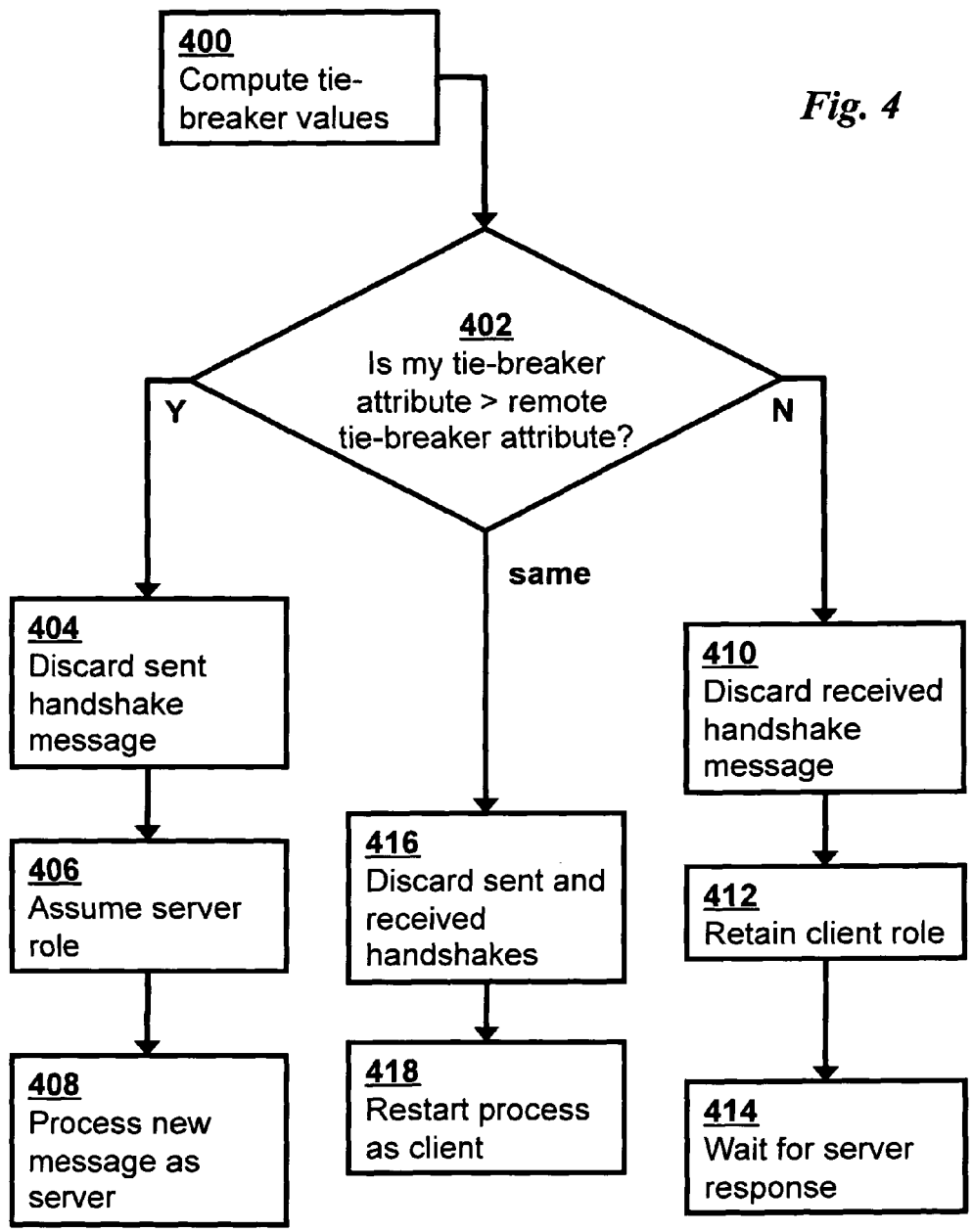
FIG. 4 is a flow chart illustrating steps of a method for negotiating a secure connection between two peers in a P2P network, illustrating tie breaker processing steps, according to a "tie breaking" technique of the invention.

Details of step 314 are shown in FIG. 4 which is a flow chart illustrating tie breaker processing steps. The principle to the tie breaker processing is to compare the value of a tiebreaker attribute of the handshake message the peer sent to the value of the corresponding tiebreaker attribute of the handshake message the peer received. The comparison of these tiebreaker attribute values determines which peer will assume the client role and which side will assume the server role. Receipt of a handshake message with a tiebreaker attribute value greater than that of the message previously sent could, for example, indicate that the recipient should assume the server role. Step 400 computes the tie breaker attribute values from the handshake messages. Step 402 then computes a comparison of the values. For example, if one value is larger than another. The result of the comparison then determines which role each peer will assume. If the recipient determines that it should assume the server role as a result of the tie breaking analysis, then in step 404 it discards the handshake message that it previously sent, in step 406 it resets its local state to assume the server role, and in step 408 it processes the received message as a new connection.

If the recipient determines that it should assume the client role as a result of the tie breaking analysis in step 402, then in step 410 it discards the message it just received, in step 412 it retains its client role state, and in step 414 it waits for the other peer to issue a server response. In one implementation, if it is not possible to resolve the tie because both sides have generated the same value for the tiebreaker attributes, then in step 416 each side discards both the sent and received handshake messages and in step 418 restarts the secure connection negotiation process again as new clients. This process is repeated until the role conflicts are resolved and the connection can be established.

In accordance with another embodiment of the technique for resolving the role conflict, back off behavior is derived from the value of a tie breaker attribute in the handshake messages. Specifically, when a new connection request is received, if the receiving peer previously sent a connection request to the sender, then both sides have chosen the client role. Each side then compares the value of the tiebreaker attribute of the handshake message it sent to the value of the tiebreaker attribute of the message it received. Whether and how the peers try to establish the connection again depends on the result of this comparison. In one implementation of this approach, both peers discard both sent and received messages, and both retry the connection with new handshake messages. Each side waits for an amount of time, functionally derived from the tie breaker attribute value, before sending the new connection attempt. In another implementation, one side, such as the one with the higher tiebreaker attribute value, sends a new connection attempt sooner by preferentially selecting a shorter wait period. This process is repeated until a connection attempt succeeds. In another implementation, both peers discard the original sent and received packets, but only one peer attempts a new connection. This could, for example, be the peer that had the higher tiebreaker attribute value in the original connection attempt. In this example, the peer with the lower tiebreaker attribute value would wait for the other peer to issue the next connection attempt.

The techniques of the present invention may be implemented by a peer computing devices connected via a P2P data network. Each peer device may include a processor, a memory, and suitable network input/output devices connecting the peer to a P2P data network. The present invention may also be realized as a digital storage medium tangibly embodying machine-readable instructions executable by a peer computer, where the instructions implement the techniques of the invention described herein. The method implemented by the peer computer is directed to a specific technological field of application, namely negotiation of secure connections between peer devices in a P2P data network.

The invention claimed is:

1. In a peer-to-peer (P2P) network, a method for establishing a secure connection between a first peer (P1) in the P2P network and a second peer (P2) in the P2P network using an unmodified client/server handshake protocol, the method comprising:
   sending by P1 a first secure connection request (R1) to P2;
   receiving by P1 a second secure connection request (R2) from P2;
   generating by P1 an error condition E in a negotiation of the secure connection between P1 and P2;
   computing by P1 a random value (V1);
   cancelling by P1 the request R1;
   discarding by P1 the request R2;
   resending by P1 the request R1 to P2 after waiting a period of time based on the value V1;
   wherein the method is applied at an application level, wherein P1 and P2 engage in secure communication using an unmodified client/server handshake protocol, wherein R1 and R2 are handshake messages of the unmodified client/server handshake protocol.

2. In a peer-to-peer (P2P) network, a method for establishing a secure connection between a first peer (P1) in the P2P network and a second peer (P2) in the P2P network using an unmodified client/server handshake protocol, the method comprising:
   sending by P1 a first secure connection request (R1) to P2;
   receiving by P1 a second secure connection request (R2) from P2;
   generating by P1 an error condition E in a negotiation of the secure connection between P1 and P2;
   computing by P1 a wait period value (V1) from an attribute of R1;
   compelling by P1 the request R1;
   discarding by P1 the request R2;
   resending R1 to P2 after waiting a period of time based on the value V1;
   wherein the method is applied at an application level wherein P1 and P2 engage in secure communication using an unmodified client/server handshake protocol, wherein R1 and R2 are handshake messages of the unmodified client/server handshake protocol.

3. The method of claim 2 wherein the attribute of R1 is selected from the group consisting of a random value of a TLS message and a random value of a DTLS ClientHello message.

4. In a peer-to-peer (P2P) network, a method for establishing a secure connection between a first peer (P1) in the P2P network and a second peer (P2) in the P2P network, using an unmodified client/server handshake protocol, the method comprising:
   sending by P1 a first secure connection request (R1) to P2;
   receiving by P1 a second secure connection request (R2) from P2;
   generating by P1 an error condition E in a negotiation of the secure connection between P1 and P2;
   computing by P1 a first value (V1) from a attribute of R1;
   computing by P1 a second value (V2) from an attribute of R2;
   comparing by P1 the values V1 and V2 to determine a tie breaker result for P1 and P2;
   assigning by P1 a client/server role to P1 based on the comparison of V1 and V2;
   wherein the method is applied at an application level wherein P1 and P2 engage in secure communication using an unmodified client/server handshake protocol, wherein R1 and R2 are handshake messages of the unmodified client/server handshake protocol.

5. The method of claim 3 further comprising, if P1 is assigned a server role based on the comparison of V1 and V2, then cancelling by P1 the request R1.

6. The method of claim 3 further comprising, if P1 is assigned a client role based on the comparison of V1 and V2, then discarding by P1 the request R2.

7. The method of claim 4 wherein the attribute of R1 is selected from the group consisting of a random value of a TLS message and a random value of a DTLS ClientHello message.

* * * * *